US011356455B2

(12) United States Patent
Su et al.

(10) Patent No.: US 11,356,455 B2
(45) Date of Patent: Jun. 7, 2022

(54) BEHAVIOR-BASED AUTHENTICATION

(71) Applicant: Citrix Systems, Inc., Fort Lauderdale, FL (US)

(72) Inventors: Fei Su, Nanjing (CN); Zheng Chai, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 279 days.

(21) Appl. No.: 16/701,721

(22) Filed: Dec. 3, 2019

(65) Prior Publication Data
US 2021/0099458 A1  Apr. 1, 2021

Related U.S. Application Data

(63) Continuation of application No. PCT/CN2019/109581, filed on Sep. 30, 2019.

(51) Int. Cl.
    *H04L 9/40*  (2022.01)
(52) U.S. Cl.
    CPC ........... *H04L 63/102* (2013.01); *H04L 63/08* (2013.01); *H04L 2463/121* (2013.01)
(58) Field of Classification Search
    CPC ... H04L 63/102; H04L 63/08; H04L 63/1425; H04L 2463/121; H04W 12/63
    See application file for complete search history.

(56) References Cited

U.S. PATENT DOCUMENTS

| | | | |
|---|---|---|---|
| 2014/0250515 A1* | 9/2014 | Jakobsson | H04W 12/068 726/7 |
| 2016/0103982 A1 | 4/2016 | Boss et al. | |
| 2016/0191498 A1 | 6/2016 | Marien | |
| 2016/0262017 A1 | 9/2016 | Lavee et al. | |
| 2017/0093920 A1* | 3/2017 | Ducatel | H04L 63/08 |
| 2017/0251008 A1* | 8/2017 | Andreeva | G06F 21/316 |
| 2017/0317993 A1* | 11/2017 | Weber | H04L 67/22 |
| 2017/0318461 A1 | 11/2017 | Bender et al. | |
| 2019/0058992 A1* | 2/2019 | Kurian | H04W 12/06 |
| 2019/0075096 A1 | 3/2019 | Chan et al. | |

FOREIGN PATENT DOCUMENTS

| | | |
|---|---|---|
| CN | 102317903 A | 1/2012 |
| CN | 103514408 A | 1/2014 |

OTHER PUBLICATIONS

Jun. 29, 2020—International Search Report—PCT/CN2019/109581.

* cited by examiner

*Primary Examiner* — Khoi V Le
(74) *Attorney, Agent, or Firm* — Banner & Witcoff, Ltd.

(57) ABSTRACT

Methods and systems for authenticating users based on user application activities are described herein. One or more questions and one or more answers may be generated and stored based on a history of user application activities associated with a user. The one or more questions and one or more answers may be generated randomly, and may relate to one or more other users. A request for access to a service may be received. Based on the request, a question associated with the history of user application activity may be selected and presented to the user. A candidate answer may be received from the user, and the user may be authenticated based on comparing the candidate answer to an answer associated with the question presented.

19 Claims, 5 Drawing Sheets

BEHAVIOR-BASED AUTHENTICATION

CROSS-REFERENCE TO RELATED APPLICATIONS

The present application claims priority to International Application No. PCT/CN2019/109581, filed Sep. 30, 2019, and entitled "Behavior-Based Authentication," which is hereby incorporated by reference as to its entirety.

FIELD

Aspects described herein generally relate to computer networking, remote computer access, virtualization, enterprise mobility management, and hardware and software related thereto. More specifically, one or more aspects describe herein provide authentication of users of computer systems based on use of software and/or hardware on the same or different computer systems.

BACKGROUND

A user may provide credentials to and authenticate with a service executing on one or more computing devices. For example, a user might input a username and password into a website, and the website may authenticate the user based on a comparison of the input username and password with a stored username and password. Two-factor authentication methods, which use two forms of authentication, are also often used by such services for added security. For example, in addition to the aforementioned username and password, such a service may additionally require input of a device-generated random character sequence.

Such authentication methods may be inconvenient for users. The two-factor authentication method described above might require that a user enter a lengthy password and use a device to generate a random code, and both steps may take an undesirably long amount of time. Moreover, an authentication method using a physical device (e.g., an encrypted access card) may be inconvenient for users, as such authentication methods require that users retrieve and use the physical device every time they wish to authenticate themselves. As a result of these inconveniences, users may avoid authenticating themselves by, for example, not logging out of services when leaving their desks.

Such authentication methods may also be insecure. Passwords may be guessable, physical devices may be lost and/or stolen, and users may inadvertently authenticate themselves on insecure devices (e.g., devices that have been compromised and that are remotely monitored). For example, a user may use the same password (or a similar style of password) on multiple services, such that theft of the user's password on one service may cause other services to become compromised.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards authenticating a user based on user application activity. Event data associated with one or more users and one or more applications may be determined. For example, a history of user events associated with use, by a user, of one or more applications may be collected, classified, and stored. The event data may relate to an identity of a user, a time of the event, an action taken at the time, an object associated with the action, a result of the action, and/or the like. One or more authentication questions and one or more authentication answers may be generated based on the history of user events. For example, answers may be determined based on a user's activity with respect to a particular application, and a question may be generated based on the answer. The answers may be generated randomly, e.g., by randomly iterating through portions of the history of user events. An authentication question may be selected from the one or more authentication questions. The selected authentication question may be randomly selected. The selected authentication question may be presented to the user in response to a request for access to a service, and a response to the authentication question may be received. Based on comparing the received response to the authentication answer associated with the selected authentication question, the user may be authenticated.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards authentication of users of a service on a computing device. To access a service (e.g., a banking service), a user may log in using an authentication method. The authentication method may be, for example, a series of prompts for information (e.g., a username and password). Authentication methods may vary in their level of convenience and security: for example, a three-digit number may be convenient but insecure as compared to a seven-character password.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and/or coupling.

Computing Architecture

Figure 1:
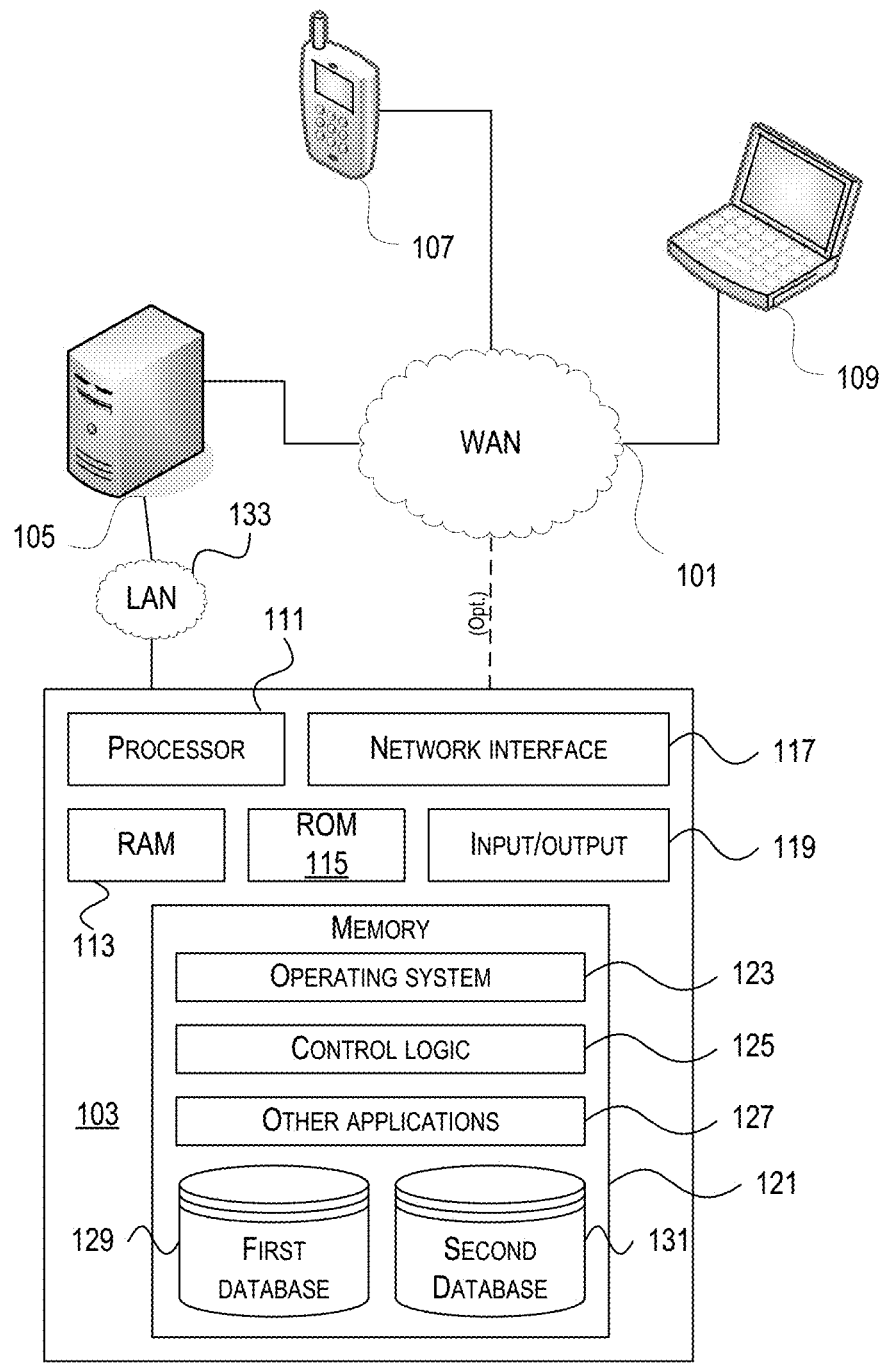
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
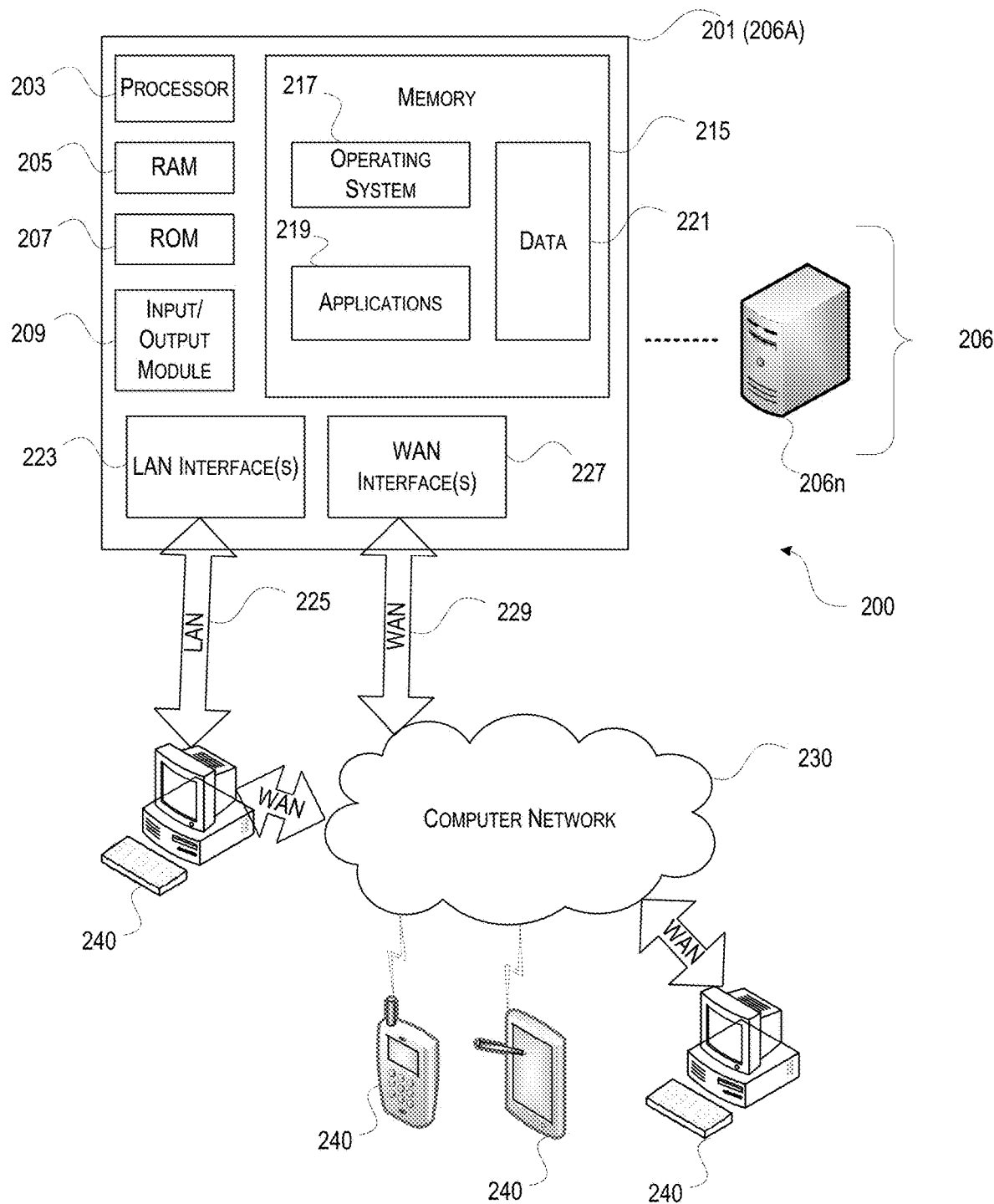
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Behavior-Based Authentication

Figure 3:
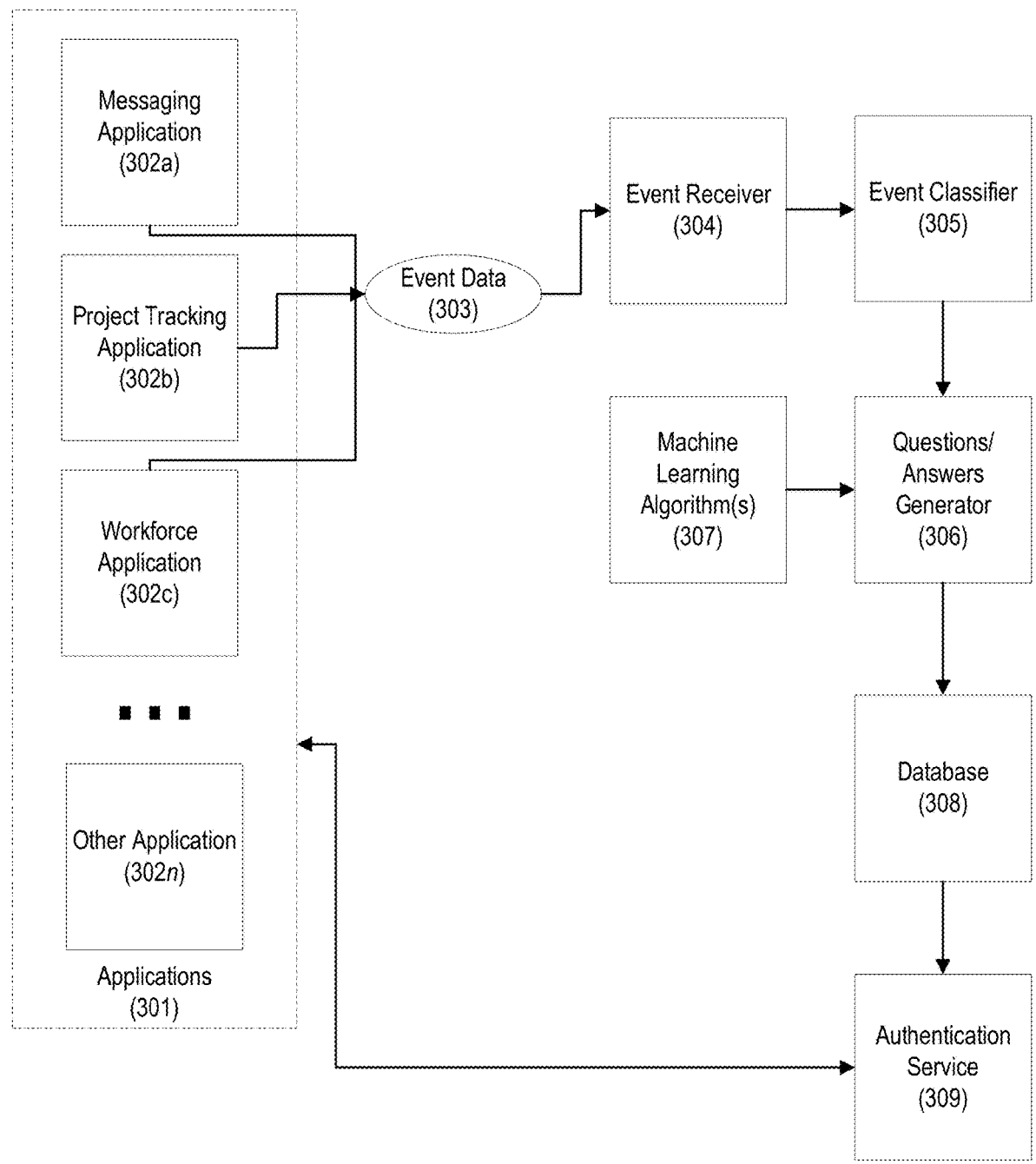
FIG. 3 depicts a system for behavior-based authentication that retrieves event data from applications.

FIG. 3 depicts a system for behavior-based authentication that retrieves event data from applications 301. The boxes depicted in FIG. 3 may represent applications or portions of applications, and may execute on one or more computing devices, e.g., on one or more portions of the computing environment 200, and/or on the nodes 103, 105, 107, and 109. For example, all elements of FIG. 3 may execute on one or more remote servers. As shown in FIG. 3, the applications 301 (which may include messaging application 302a, project tracking application 302b, workforce application 302c, and other applications, including other application 302n) may provide event data 303 to an event receiver 304. The event receiver 304 may transmit the event data 303 to the event classifier 305, which may then transmit classified event data to a question/answer generator 306. The question/answer generator 306 may use one or more machine learning algorithm(s) 307 when generating questions and/or answers. Questions and/or answers generated by the question/answer generator 306 may be stored by a database 308, which may provide the questions and/or answers generated to an authentication service 309. The authentication service 309 may be used to authenticate access to the applications 301 and/or any other application or service.

The applications 301, shown in FIG. 3 as including the messaging application 302a, the project tracking application 302b, the workforce application 302c, and other applications, including the other application 302n, may be any applications which may execute on one or more computing devices. Though three applications are shown in FIG. 3, any number of applications may be used. In other words, the ellipses shown in FIG. 3 may indicate any number of applications, and the variable n used with regard to the other application 302n may be any number. For example, multiple types of the messaging application 302a may be available. All or some of the applications 301 may be executed remotely, e.g., on one or more remote desktops. All or some of the applications 301 may be executed on different computing devices such that, for example, the messaging application 302a may execute on a smartphone, whereas the workforce application 302c may execute an a laptop. The applications 301 may be configured to log event data associated with one or more users (e.g., a first user messaging a second user using the messaging application 302a). The applications may be configured to log event data themselves (e.g., in log files stored by the applications themselves), and/or may be caused to log event data by a different application (e.g., a tracking application, which may monitor the activity of other applications and may log event data based on the activity).

The event data 303 may be any information relating to use, by one or more users, of the applications 301. The event data 303 may be recorded in one or more log files by the applications 301. Additionally and/or alternatively, the event data 303 relating to a first application may be collected by one or more different applications (e.g., a remote access application, an application monitoring service, operating system logs). The event data 303 may comprise one or more indications of use of the applications 301 for a single user and/or a plurality of users. The event data 303 may indicate information such as a user of one or more applications, an event action taken with respect to the one or more applications, one or more locations (e.g., on a network, in an office, in the United States) associated with the event action, a result of the event action, and the like. For example, the event data 303 may indicate that a user logged into the workforce application 302c in their office at a particular time. As another example, the event data 303 may indicate that a different user, located in Singapore, added a project task to the project tracking application 302b at a particular time. The event data 303 for each of the applications 301 may be different: for example, the messaging application 302a may generate messaging logs (e.g., a record of all conversations between employees in an office), whereas the workforce application 302c may generate a summary of user login/logout data (e.g., when employees clocked in and out of the office). The event data 303 may be associated with one or more time periods. For example, the event data 303 may correspond to use, by the user, of the applications 301 over the span of a month. As another example, portions of the event data 303 may be time stamped based on, e.g., when the portions were added to the event data 303.

The event receiver 304 may receive the event data 303 from the applications 301 by collecting log files and/or other information from one or more computing devices executing the applications 301. The event receiver 304 may be configured to periodically query the one or more computing devices executing the applications 301 and receive the event data 303. For example, the event receiver 304 may be configured to, on a weekly basis, retrieve log files from one or more storage devices of the computing devices executing the applications 301. As another example, the event receiver 304 may be configured to, in response to a user authentication request, request and receive, from the one or more computing devices executing the applications 301, a new version of the event data 303. Receiving the event data 303 need not comprise activity by the applications 301. For example, the applications 301 may be configured to store portions of the event data 303 on a storage device, and the event receiver 304 may periodically retrieve the portions of the event data 303 from the storage device.

The event classifier 305 may classify the event data 303 received by the event receiver 304. Because the event data 303 for the applications 301 may be in different formats and may otherwise be voluminous, the event classifier 305 may classify the event data 303 to standardize the event data 303. For example, portions of the event data 303 indicating which user, of a plurality of users, performed an event action using one or more of the applications 301 may be classified as user information, whereas portions of the event data 303 indicating when the event action was performed may be classified as time information and, if needed, converted into a common time format. In this manner, similar portions of the event data 303 (e.g., a portion of the event data 303 associated with the messaging application 302a and a second portion of the event data 303 associated with the workforce application 302c) may be classified similarly and treated similarly.

Table 1, below, shows an example set of event data 303 that has been classified. As shown in Table 1, the event data 303 may be classified based on a user (e.g., a username), an event time (e.g., when the event occurred), an event action (e.g., what happened), event object(s) (e.g., what was affected by the action), an event result (e.g., what happened as a result of the event action to the event object), and event notes (e.g., any additional relevant detail relating to the action). As indicated by Table 1, not all portions of the event data 303 may fall into these categories.

TABLE 1

| User Name (U) | Event Time (T) | Event Action (A) | Event Object (O) | Event Result (R) | Event Notes (N) |
| --- | --- | --- | --- | --- | --- |
| User1 | 9:00 AM | Login | Messaging Application | Successful Login | N/A |
| User2 | 9:15 AM | Add Personal Data | Personal Data Area | Success | N/A |
| User1 | 9:30 AM | Message | User2 | Message Delivered | Message Contents |

The first row of Table 1 indicates that, at 9:00 AM, User1 successfully logged into the messaging application 302a. The second row of Table 1 indicates that, at 9:15 AM, User2 successfully added personal data to a personal data area of the workforce application 302c. The third row of Table 1 indicates that, at 9:30 AM, User1 sent User2 a message, that the message was delivered, and the contents of the message. As further indicated by the header row of Table 1, the user name may be referred to as variable "U," the event time may be referred to as variable "T," the event action may be referred to as variable "A," the event object may be referred to as variable "O," the event result may be referred to as variable "R," and the event notes may be referred to as variable "N," such that the event data 303 may be collectively a set of U, T, A, O, R, and N.

The question/answer generator 306 may, using the classified event data from the event classifier 305, generate one or more questions (and one or more corresponding answers). As an example, using the data from Table 1, the question/answer generator 306 may generate a question for User1 asking when the user logged into the messaging application, and an answer indicating 9:00 AM. The questions and answers may be configured to be answerable by one or more users. The questions and answers generated by the question/answer generator 306 may be associated with activity known to only one or more users, preventing other users from answering (and/or guessing the answers to) the questions. Similarly, the questions and answers generated by the question/answer generator 306 may be configured to be easily remembered. For example, a user might have difficulty remembering an exact hour when they sent a particular e-mail, but may remember whether the same e-mail was sent in the morning or in the evening. The questions and answers generated by the question/answer generator 306 may additionally and/or alternatively be associated with one or more physical locations. For example, questions/answers generated by the question/answer generator 306 may be based on, e.g., where the user (and/or the user's device) was located during a particular action indicated by the event data 303.

The question/answer generator 306 may generate different questions and answers for different applications (e.g., of the applications 301) and/or different users. For example, the type of question generated based on use of the messaging application 302a (e.g., a question regarding when the user sent a particular message using the messaging application 302a) may be different than the type of question generated based on use of the workforce application 302c (e.g., a question regarding when the user logged in to the workforce application 302c). Questions/answers may be generated for a plurality of users, and the questions/answers may be different for different users. For example, a first user may be asked more questions about use of the messaging application 302a as compared to a second user because the first user uses the messaging application 302a more than the second user.

The question/answer generator 306 may generate questions and answers associated with one or more interactions between different users. A user may interact with a different user using one or more of the applications 301, and the questions and/or answers generated by the question/answer generator 306 may relate to such interactions. For example, the question/answer generator 306 may ask a user what time of day they messaged a different user.

The question/answer generator 306 may filter event data. The event data 303 may be undesirably voluminous, such that filtering may reduce the computational resources necessary for generating questions/answers. For example, the event data 303 may comprise every message sent by a user using the messaging application 302a over the span of two years, meaning that some data may be associated with activities that have long since been forgotten by the user. Filtering may be performed based on, e.g., a timestamp, a time period, a type of event, or the like. For example, the question/answer generator 306 may determine a timestamp (e.g., Monday of a preceding week), and determine questions based on event data associated with activity after that timestamp.

The question/answer generator 306 may be configured to filter the event data 303 based on the event data satisfying a threshold. While the event data 303 may be voluminous, portions of the event data 303 may be limited in size and/or scope. For example, while the messaging application 302a may log all messaging activity by one or more users, the workforce application 302c may log only a fraction of all activities by users. The question/answer generator 306 may, based on determining that a first portion (e.g., a first set) of the event data 303 satisfies a size threshold (e.g., and is thus not sufficiently large), retrieve a second portion of the event data 303.

The question/answer generator 306 may be configured to randomly select one or more portions of the event data 303. To prevent predictability of the question/answer generator 306 (as predictability may undesirably allow questions to be more easily guessed), the question/answer generator 306 may randomly select portions of the event data 303 to generate questions/answers based on. The random selection may be for different classified portions of the event data 303. For example, the question/answer generator 306 may randomly select an event action and an event object (e.g., what happened, and to what) from the event data 303.

The question/answer generator 306 may, using the event data 303, generate answers, then questions based on those answers. It may be easier to generate a question based on an answer, rather than vice-versa. For example, using the event data, the question/answer generator 306 may first determine a user, an event time, an event action, an event object, and an event result (e.g., that User 1 successfully logged into the messaging application 302a at 9:00 AM EST on Monday), then generate a question (e.g., "When did you log into the messaging application?").

The machine learning algorithms 307 may be used to improve the questions and/or answers generated by the question/answer generator 306. The machine learning algorithms 307 may be trained based on current event data (e.g., the most recent form of the event data 303), a history of event data (e.g., previous versions of the event data 303, such as from a month ago), history of user authentication attempts (e.g., questions that users have historically failed and/or guessed), or the like. Using this training, the machine learning algorithms 307 may influence which questions are generated by the question/answer generator 306. For example, if users typically fail questions relating to when they sent messages to other users, the machine learning algorithms 307 may learn this over time based on incorrect responses by users during authentication and, on that basis, cause the question/answer generator 306 to avoid generating those type of questions.

The database 308 may be configured to store the questions and/or answers generated by the question/answer generator 306. The database 308 may be any form of storage device and/or storage devices. For example, the database 308 may be the same or similar as the storage device and/or storage devices storing the applications 301 and/or the event data 303. The database may be configured to associate questions with answers, such that one or more computing devices may, using the database, determine whether candidate answers associated with a question (e.g., answers by a user using the authentication service 309) correspond to correct answers associated with the question. For example, the database 308 may be a table comprising three columns: a column corresponding to one or more users (e.g., the user to which a question and/or answer may be associated), a column corresponding to a question, and a column corresponding to an answer to the question.

The authentication service 309 may be configured to facilitate authentication of users. The authentication service 309 may be associated with one or more services such that, based on authentication of one or more users using the questions and/or answers in the database 308, the one or more users are provided access to the service. For example, the authentication service 309 may authenticate users based on questions/answers generated using events data associated with remote applications and, upon authentication, provide users access to a remote application service. The authentication service 309 may be configured to authenticate users using questions/answers based on user behavior. For example, if a user logs out of a service and returns in three minutes, the user may be presented with a first quantity of questions. As another example, if the user logs out of the service and returns in three hours, the user may be presented with a second quantity of questions that is greater than the first quantity of questions. As another example, the difficulty of questions (e.g., the specificity of answer required for a particular question) may be based on how long the user has been logged out of the service, a security level associated with the service, a time of day, or the like. The authentication service 309 may be part of the one or more services to which access is provided. For example, the authentication service 309 may be part of a remote application service which, upon authentication, provides users remote access to the applications 301. The authentication service 309 may be configured to replace an existing authentication method with an authentication method based on the questions and/or answers. For example, the authentication service 309 may replace a username and password entry form with an indication of a question and a text field prompt for an answer to the question. Once a question is answered by the user, it may be deleted (e.g., from the database 308) such that the same question is not asked again. The authentication service 309 may be configured to use questions/answers to authenticate users based on a time period. The authentication service 309 may refresh questions/answers based on a time period. For example, the authentication service 309 may present questions that a user must answer within a predetermined time period (e.g., within a minute). As another example, each question of a plurality of questions may be associated with a time period (e.g., based on the difficulty of the question), such that the authentication service 309 may disallow access to a service responsive to determining that a user exceeds the sum of time periods associated with presented questions.

Figure 4:
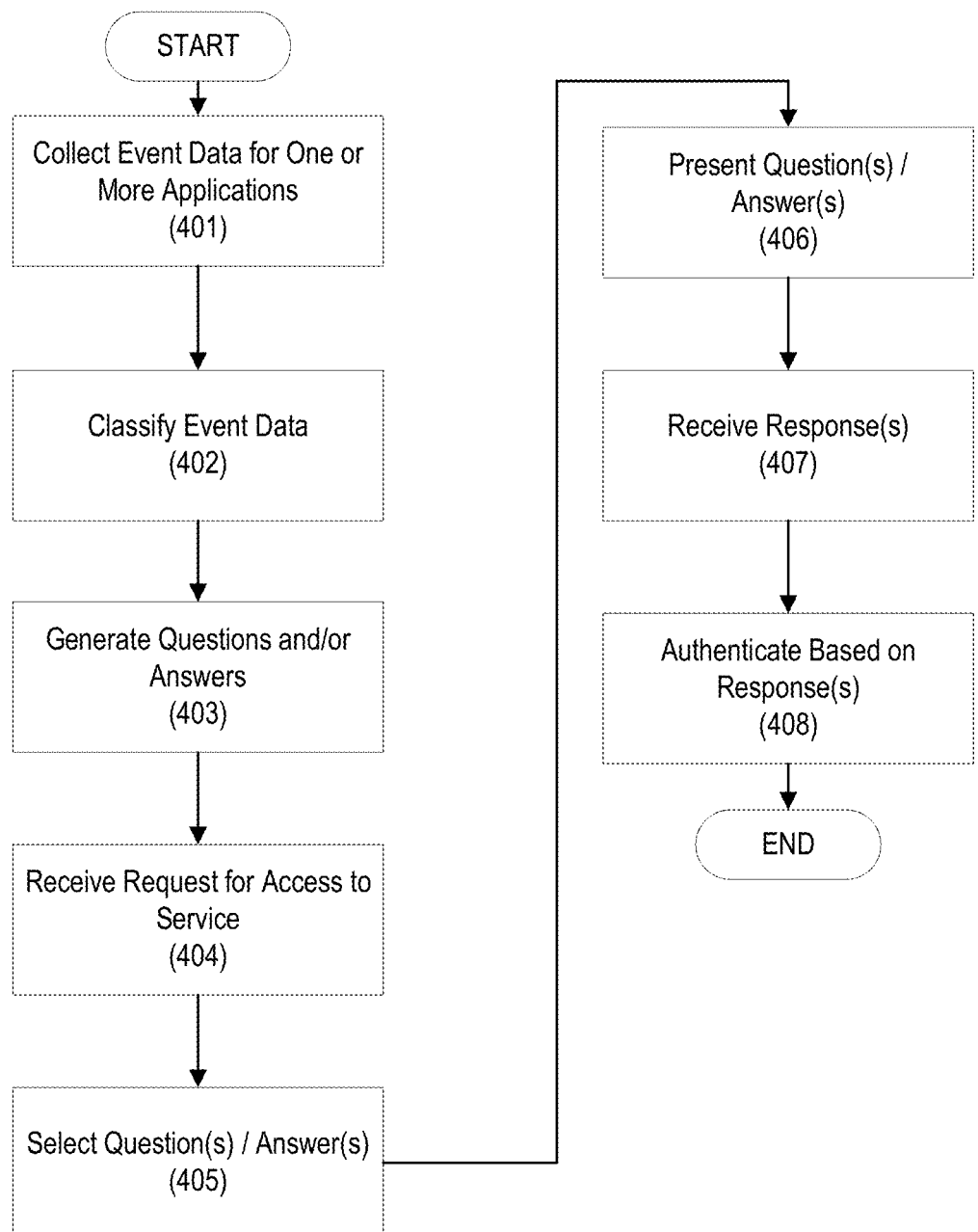
FIG. 4 is a flowchart depicting steps which may be performed by all or portions of the system for behavior-based authentication.

FIG. 4 is a flowchart depicting steps which may be performed by all or portions of the system shown in FIG. 3. FIG. 4 may be all or portions of an algorithm which may be executed by one or more computing devices, e.g., on one or more portions of the computing environment 200, and/or on the nodes 103, 105, 107, and 109. In step 401, the event data 303 may be collected, e.g., by the event receiver 304, for the applications 301. In step 402, the event data 303 may be classified (e.g., by the event classifier 305). In step 403, questions and/or answers may be generated based on the event data 303 (e.g., by the question/answer generator 306, using one or more machine learning algorithms 307, and/or using the classified event data provided by the event classifier 305). As part of step 403, the questions and/or answers generated may be stored (e.g., in the database 308). This process is described in greater detail in FIG. 5.

In step 404, a request for access to one or more services may be received from a user. The request for access to the one or more services may be received via the authentication service 309. The request need not comprise authentication credentials. For example, the request may comprise a user accessing a web page associated with access to one or more services (e.g., a web page used to log in to a remote access application system). As another example, the request for access may be received responsive to a determination that the user is likely to seek access to the one or more services (e.g., because the user has logged in to their computer, and is likely to open an application associated with the one or more services).

In step 405, based on the request for access, one or more questions (and one or more corresponding answers) may be selected. The one or more questions selected may be one or more of the questions generated in step 403. The questions may be selected randomly or in particular order (e.g., as ordered in the database 308). One or more answers may be selected based on the one or more questions. The one or more answers selected may comprise correct answers and incorrect answers. For example, if a question relating to a time period is selected, a correct answer (e.g., 9:00 PM) may be selected, and two incorrect answers (e.g., 12:00 PM, 1:00 AM) may be selected.

In step 406, the one or more questions (and the one or more answers) selected in step 405 may be presented. Presenting the questions/answers may comprise replacing an existing authentication method (e.g., username and password entry field(s)) with the selected question(s) and one or more fields to answer the question(s). Presenting the questions/answers may additionally and/or alternatively comprise presenting the selected question(s) and a plurality of answers (e.g., correct and incorrect answers) for selection by a user. The fields for answer entry need not be plain text entry boxes. For example, a user may be presented with a drop-down menu comprising a plurality of possible answers to the question(s) presented. The user may be presented with a plurality of answers which may be multiply selected (e.g., such that the user may select multiple answers for the same question). For example, one question may ask the user to identify both a time period and a person that they messaged using the messaging application 302a. The one or more questions may be displayed for a time period. For example, each question may be presented for thirty seconds, and each question may be changed after the thirty seconds have elapsed. As another example, a service may be locked based on a determination that a user took more than a predetermined quantity of time to answer the questions presented in step 406.

As one example of step 406, five questions may be presented: "When did you arrive in the office yesterday?," "What did you add to the project tracking application last week?," "Who did you message two days ago?," "When did you submit your code to the repository?," and "What was your department's last test score?" For each question, a plurality of options (e.g., eight different proposed answers in a drop-down menu) may be presented, and/or a method which allows users to select multiple answers may be presented. One of the plurality of presented answers may be correct for each question. The questions and answers may be presented to the user, such that the user may select an answer for each question.

In step 407, an authentication response to the question(s) presented may be received from a user. The authentication response may comprise one or more candidate answers to the one or more questions presented.

In step 408, based on the response, the user may be authenticated. The response may comprise one or more candidate answers, and the one or more candidate answers may be compared to answers stored (e.g., in the database 308) to authenticate the user.

Figure 5:
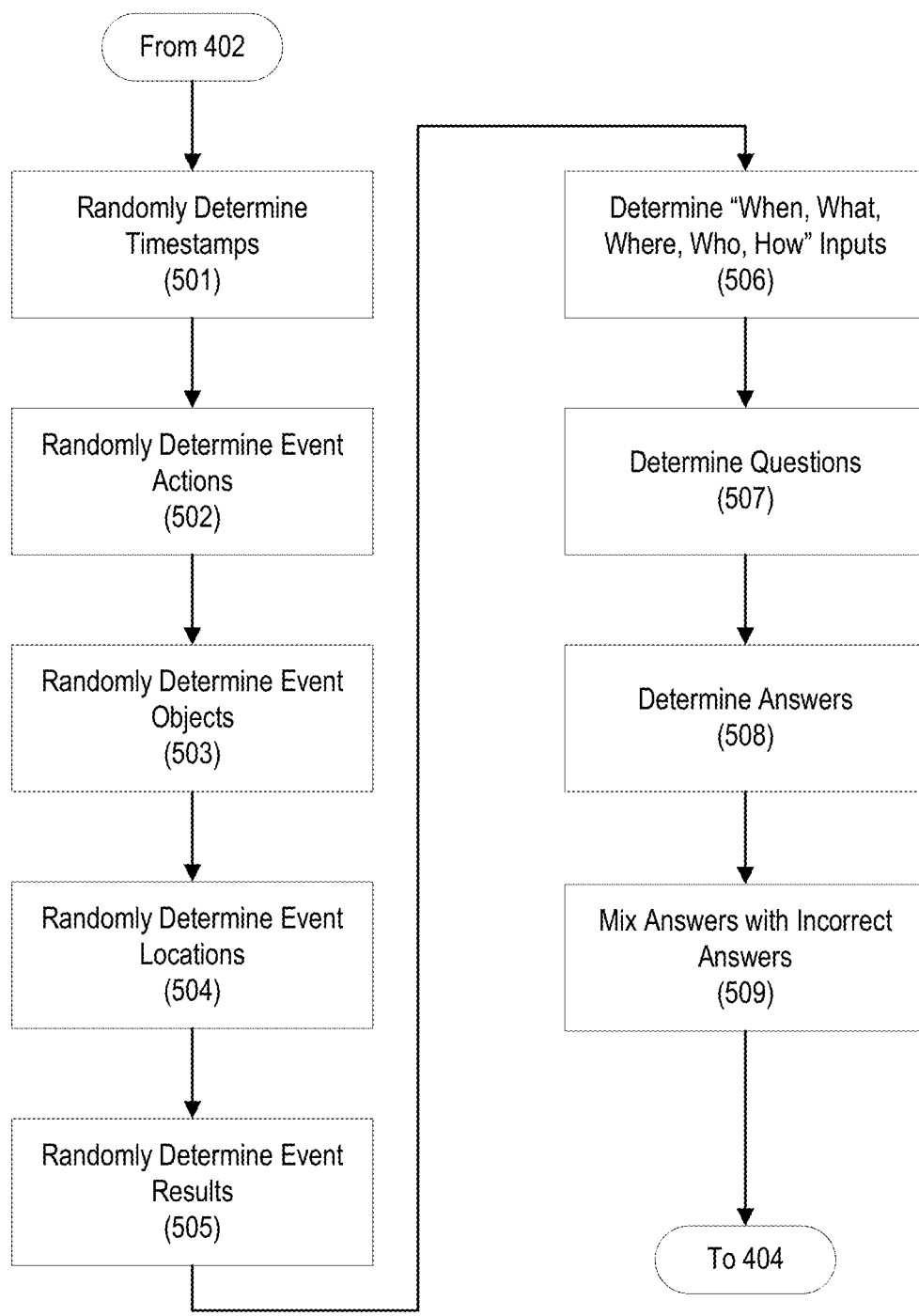
FIG. 5 is a flowchart depicting steps which may be performed as part of randomly determining questions and/or answers.

FIG. 5 shows a series of steps which may be performed as part of randomly determining questions and/or answers (e.g., step 403 in FIG. 4). In step 501, timestamps may be randomly determined and stored as, e.g., $SOS_T$. The size of set $SOS_T$ may be greater than 256 entries. In step 502, event actions (e.g., possible event actions in the event data 303) may be randomly determined and stored as, e.g., $SOS_A$. The size of set $SOS_A$ may be greater than 1024 entries. In step 503, event objects (e.g., objects which may be acted upon by event actions) may be randomly determined and stored as, e.g., $SOS_O$. The size of set $SOS_O$ may be greater than 2014 entries. In step 504, event locations (e.g., locations at which the event actions may be performed) may be randomly determined and stored as $SOS_L$. The size of set $SOS_L$ may be greater than 256 entries. In step 505, event results (e.g., results of the event actions on the event objects in the event locations) may be randomly determined and stored as $SOS_R$. The size of set $SOS_R$ may be greater than 2014 entries. Such random determinations (e.g., steps 501-505) may be performed by, e.g., evaluating the event data 303 and determining, based on the event data 303, a plurality of possible timestamps, event actions, event objects, event locations, and/or event results. This, for instance, prevents randomly generating a timestamp that is not associated with activity reflected in the event data 303. For example, randomly determining the event actions in step 502 may comprise determining, based on the event data 303, which actions have been performed over a time period (e.g., the last year), then randomly selecting one or more actions from those actions.

In step 506, 5W key words ("When," "What," "Where," "Who," and "How") may be determined (e.g., as input) for a set (e.g., $UAE_{RAND}$). In this manner, a set ($UAE_{RAND}$) may be generated based on the randomly determined timestamps, the randomly determined event actions, the randomly determined event objects, the randomly determined event locations, and the randomly determined results. The set $UAE_{RAND}$ may comprise a semantic word set (e.g., "When," "What," "Who," "Where," and "How") along with one or more of $SOS_T$, $SOS_A$, $SOS_O$, $SOS_L$, and/or $SOS_R$.

In step 507, a set of questions, $Q_O$, may be determined based on any of the determinations made from steps 501-506 (e.g., using $UAE_{RAND}$). For example, a question may be based on the randomly-determined event actions as determined in step 502. As another example, a question may be based on the randomly-determined event results as determined in step 505. The set $UAE_{RAND}$ may be used to make these determinations. For example, determining the set of questions may comprise randomly selecting one or more entries in $UAE_{RAND}$.

In step 508, a set of question answers, $Q_A$, may be determined based on any of the determinations made from steps 501-506 (e.g., using $UAE_{RAND}$) and/or based on the set of questions, $Q_O$. The answers in $Q_A$ may comprise one or more correct answers corresponding to the set of questions $Q_O$. The correct answers in $Q_A$ may be referred to as master answers. Determining $Q_A$ may comprise iterating through $UAE_{RAND}$ and, for each of the semantic word set (e.g., "When," "What," "Who," "Where," and "How"), selecting one or more elements from one or more of $SOS_T$, $SOS_A$, $SOS_O$, $SOS_L$, and/or $SOS_R$.

In step 509, incorrect answers may be determined and mixed with the set of question answers $Q_A$. This step may augment $Q_A$ such that, in addition to correct answers in $Q_A$, various entries in $Q_A$ comprise a randomly-determined timestamp, a randomly-determined event action, a randomly-determined event object, a randomly-determined event location, and/or a randomly-determined event result. This step may be merged with step 507 if, for example, the answer to a question is a Boolean answer (e.g., the answer to a question such as "Is it true that user 'TomS' logged in to the messaging application 302a at or around 18:30 on July 10?"). The result of step 509 may be a set of question answers $Q_A$ that comprises both correct and incorrect answers.

As such, the steps presented in FIG. 5 may generate a set of questions, $Q_O$, as well as a set of answers, $Q_A$, such that the set of answers includes both correct and incorrect answers. This advantageously allows authentication of the user by presenting a plurality of candidate answers for a question, such that the user need not manually enter the answer to a question.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   determining, by a computing device, a history of user events that indicates actions taken by a user during use, by the user, of one or more applications, wherein determining the history of user events comprises:
      determining a first set of user events associated with a first application of the one or more applications; and
      determining, based on determining that the first set of user events satisfies a threshold, a second set of user events associated with a second application of the one or more applications, wherein the history of user events is based on the first set and the second set;
   generating, for the user and based on the history of user events:
      a plurality of authentication questions relating to one or both of:
         a time associated with one or more of the actions taken by the user during use of the one or more applications, or
         a location of a user device during one or more of the actions taken by the user during use of the one or more applications, and
      a plurality of authentication answers associated with the plurality of authentication questions;
   selecting, from the plurality of authentication questions and in response to a request for access to a service, a first authentication question;
   receiving a response to the first authentication question; and
   providing, to the user and based on comparing the response to the plurality of authentication answers to determine whether the response correctly corresponds to the actions taken by the user during use of the one or more applications, access to the service.

2. The method of claim 1, wherein:
   the first authentication question is associated with the first application of the one or more applications; and
   a second authentication question, of the plurality of authentication questions, is associated with the second application of the one or more applications.

3. The method of claim 1, wherein the first authentication question is associated with an interaction between the user and a second user.

4. The method of claim 1, wherein determining the history of user events comprises:
   retrieving, from the first application of the one or more applications, a user activity log.

5. The method of claim 1, wherein generating the plurality of authentication questions comprises:
   determining a timestamp; and
   filtering, based on the timestamp, the history of user events.

6. The method of claim 1, wherein generating the plurality of authentication questions comprises:
   randomly selecting, from the history of user events, an event action; and
   randomly selecting, based on the event action, an event object, wherein the first authentication question is associated with the event action and the event object.

7. The method of claim 1, further comprising:
   replacing presentation of an authentication method with presentation of the first authentication question.

8. The method of claim 1, wherein the first authentication question is associated with a physical location.

9. A method comprising:
   receiving, by a computing device and from a plurality of second computing devices, one or more indications of actions taken by a user during use, by the user, of one or more applications associated with a service;
   determining, by the computing device and based on the one or more indications, a history of user events, wherein determining the history of user events comprises:
      determining a first set of user events associated with a first application of the one or more applications; and
      determining, based on determining that the first set of user events satisfies a threshold, a second set of user events associated with a second application of the one or more applications, wherein the history of user events is based on the first set and the second set;
   generating, based on the history of user events, a plurality of authentication questions relating to one or both of:
      a time associated with one or more of the actions taken by the user during use of the one or more applications, or
      a location of a user device during one or more of the actions taken by the user during use of the one or more applications;

causing presentation, in response to receiving a request for access to the service, of a first authentication question of the plurality of authentication questions;

receiving a candidate answer to the first authentication question; and providing, to the user and based on determining that the candidate answer correctly corresponds to the actions taken by the user during use of the one or more applications, access to the service.

10. The method of claim 9, wherein the service is associated with remote access to the one or more applications.

11. The method of claim 9, wherein generating the plurality of authentication questions comprises:

determining a timestamp; and filtering, based on the timestamp, the one or more indications.

12. The method of claim 9, further comprising:

generating, based on the history of user events, a plurality of authentication answers, wherein providing access to the service is based on comparing the candidate answer to one or more of the plurality of authentication answers.

13. The method of claim 9, wherein generating the plurality of authentication questions comprises, for each authentication question of the plurality of authentication questions:

determining, based on the history of user events, an event action associated with a first application of the one or more applications; and determining, based on the event action, an event object.

14. A method comprising:

determining, by a computing device, a history of user events that indicates actions taken by a user during use, by the user, of a plurality of applications, wherein determining the history of user events comprises:

determining a first set of user events associated with a first application of the plurality of applications; and determining, based on determining that the first set of user events satisfies a threshold, a second set of user events associated with a second application of the plurality of applications, wherein the history of user events is based on the first set and the second set:

determining, by the computing device, based on the history of user events, and for the user, a plurality of authentication questions, wherein each authentication question of the plurality of authentication questions corresponds to:

one or both of:

a time associated with an action taken by the user during use of one or more applications of the plurality of applications, or a location of a user device during the action taken by the user during use of the one or more applications, and a result of the action;

generating, based on the plurality of authentication questions, a plurality of authentication answers;

receiving a candidate authentication answer associated with a first authentication question of the plurality of authentication questions; and providing, to the user and based on comparing the candidate authentication answer to the plurality of authentication answers to determine whether the candidate authentication answer correctly indicates at least one action taken by the user during use of the application, access to a service.

15. The method of claim 14, wherein each authentication question of the plurality of authentication questions further corresponds to:

a time associated with the action.

16. The method of claim 14, wherein each authentication question of the plurality of authentication questions further corresponds to:

one or more second users associated with the action.

17. The method of claim 14, further comprising:

receiving a request for authentication; and selecting, from the plurality of authentication questions and based on the request for authentication, the first authentication question.

18. The method of claim 14, wherein receiving the candidate authentication answer comprises receiving, in response to causing presentation of the first authentication question, the candidate authentication answer.

19. The method of claim 14, wherein the plurality of applications are associated with the service, and wherein the candidate authentication answer is associated with an authentication request associated with the service.

* * * * *